United States Patent [19]

Nozaki et al.

[11] Patent Number: 4,943,444
[45] Date of Patent: Jul. 24, 1990

[54] JELLY RESEMBLING THE FLESH OF FRUIT AND PROCESS FOR PRODUCING THE SAME

[75] Inventors: Hisashi Nozaki; Seiya Sakurai, both of Saitama, Japan

[73] Assignees: Kabushikikaisha Kibun, Tokyo; Kabushikikaisha Kyowashokuhin, Saitama, both of Japan

[21] Appl. No.: 287,868

[22] Filed: Dec. 21, 1988

[30] Foreign Application Priority Data

Dec. 22, 1987 [JP] Japan .................................. 62-322808

[51] Int. Cl.⁵ ............................................ A23L 1/072
[52] U.S. Cl. ..................................... 426/573; 426/524; 426/615; 426/654
[58] Field of Search ................. 426/573, 654, 615, 524

[56] References Cited

U.S. PATENT DOCUMENTS

| | | | |
|---|---|---|---|
| 4,582,714 | 4/1986 | Ford et al. | 426/564 |
| 4,647,470 | 3/1987 | Sanderson et al. | 426/573 |
| 4,676,976 | 6/1987 | Toba et al. | 426/654 |
| 4,746,528 | 5/1988 | Prest et al. | 426/659 |

FOREIGN PATENT DOCUMENTS

| | | |
|---|---|---|
| 0018153 | 10/1980 | European Pat. Off. . |
| 0185511 | 6/1986 | European Pat. Off. . |
| 0225154 | 6/1987 | European Pat. Off. . |
| 56-51740 | 12/1981 | Japan . |
| 0208960 | 12/1982 | Japan . |
| 1067457 | 4/1986 | Japan . |
| 2190058 | 8/1987 | Japan . |
| 2168366 | 6/1986 | United Kingdom . |
| 2204474 | 11/1988 | United Kingdom . |

*Primary Examiner*—Donald E. Czaja
*Assistant Examiner*—Helen Pratt
*Attorney, Agent, or Firm*—Browdy and Neimark

[57] ABSTRACT

A jelly having flavor and palatability that resemble those of the flesh of fruit, and a process for producing such jelly are disclosed. The jelly has a konjak flour or konjak mannan and fruit juice as main ingredients, and is produced by the steps of heating and cooling an alkaline konjak paste to prepare a konjak jelly, adding the juice of fruit to said konjak jelly, stirring the ingredients to form a mixture, freezing the mixture, and finally thawing the frozen mixture. This jelly has great economic utility, good keeping quality and is anticipated to fully satisfy the various taste preferences of the people of today who have a wide variety of likes and dislikes.

15 Claims, No Drawings

JELLY RESEMBLING THE FLESH OF FRUIT AND PROCESS FOR PRODUCING THE SAME

TECHNICAL FIELD

The present invention relates to a jelly which resembles the flesh of fruit in flavor and palatability, as well as a process for producing said jelly.

BACKGROUND ART

Jelly is a food preparation made by solidifying the juice of fruit or the like with agar, gelatin, carrageenan, etc. and is served cold in order to fully exhibit its smoothness to the tongue and homogeneous consistency. Jelly has therefore been a popular dessert for many people.

However, all of the jellies so far made available have been rather monotonous in taste and are not completely satisfactory for the people of today who have a very wide variety of likes and dislikes in their food preferences. One of the approaches that has been taken to fill this gap is to add fragments of the flesh of various fruits to a jelly so that a more versatile product range can be provided in terms of flavor. Although such jelly products are marketed in large quantities, the jelly itself is in no way different from the traditional type.

An object, therefore, of the present invention is to provide a jelly that resembles the flesh of fruit and which is so unique as to drastically change the image of "jelly" in the conventional sense of the term.

DISCLOSURE OF THE INVENTION

The present inventors have engaged in the study of jelly bases that have not previously been used in jelly products of the type contemplated by the present invention, and during their trial-and-error based research, they thought of using the konjak jelly which they had developed previously. As a result of further studies made in this respect, the present inventors found that when this konjak jelly was treated under specified conditions, a jelly containing the juice of fruit could be obtained which unexpectedly enough presented palatability and flavor that were just like those of the fruit whose juice was contained in the jelly. The present invention has been accomplished on the basis of this finding.

In one aspect, the present invention provides a jelly that resembles the flavor and palatability of the flesh of fruit and which contains a konjak flour or konjak mannan and the juice of a selected fruit or fruits as main ingredients.

In another aspect, the present invention provides a process for producing a jelly that resembles the flesh of fruit which comprises the steps of: heating and cooling an alkaline konjak paste to prepare a konjak jelly; adding the juice of a fruit to said konjak jelly; stirring the ingredients to form a mixture; freezing the mixture; and finally thawing the frozen mixture.

The present invention is described hereinafter in detail.

In order to produce the jelly of the present invention which resembles the flesh of fruit, it is necessary that an alkaline konjak paste be prepared from a konjak flour, followed by production of konjak jelly. Details of the process for producing konjak jelly are given in the specification of commonly assigned International Publication No. WO88/03760 (corresponding to U.S. application Ser. No. 07/229,174) which is incorporated herein as reference. Stated more specifically, either one of the following methods may be adopted to produce a konjak jelly:

(1) a konjak flour is swollen by addition of water, and an alkali agent is added and mixed with the swollen konjak flour to render it alkaline, the flour thereafter being heated and cooled to obtain a konjak jelly;

(2) a konjak flour is swollen by addition of water containing an alkali agent, and an alkali agent is added and mixed with the swollen konjak flour to render it alkaline, and thereafter the flour is heated and cooled to obtain a konjak jelly; or (3) an alkali agent is added and mixed with a konjak flour, which is swollen by addition of water and thereafter heated and cooled under an alkaline condition to obtain a konjak jelly.

The konjak flour used in each of the methods described above is the flour of konjak or dried konjak.

The alkali agent to be used is a basic amino acid, a basic salt or a mixture thereof.

Specific examples of the basic amino acid include arginine, histidine, lysine, citruline and ornithine. A particularly preferred basic amino acid is arginine or lysine. These basic amino acids may be used either on their own or as admixtures.

The basic amino acid is preferably used in an amount of 1.25–15 wt% of the konjak flour.

Any basic edible salts may be used as basic salts but basic phosphate salts and organic acid salts are preferred. For example, sodium carbonate, sodium bicarbonate, calcium carbonate, disodium phosphate, trisodium phosphate, dipotassium phosphate, tripotassium phosphate, sodium polyphosphate, sodium citrate, sodium lactate, etc. are preferably used.

The basic salts are preferably used in an amount of 0.01–5 wt% of the konjak flour.

In order to provide a buffer effect, acids such as citric acid and lactic acid or acidic salts such as sodium dihydrogenphosphate and potassium dihydrogenphosphate may be appropriately combined such as to produce a final pH in a weakly alkaline range.

The heating temperature and time should be adjusted in accordance with the concentration of salts used, the pH and the physical properties of the konjak jelly. If the pH of konjak paste is fairly high, the heating time is shortened, and vice versa.

The konjak jelly of the present invention has to be heated under alkaline conditions, and heating is desirably performed with the pH adjusted in such a way that the pH of the konjak jelly obtained after cooling will lie within the range of 8.0–10.5, preferably 8.2–10.0.

The condition to be selected in this case is the combination of a heating temperature of 60°–90° C. with a heating time of 5–210 minutes.

Preferred combination of pH, temperature and time must be selected in such a way that the pH of the konjak jelly obtaned after cooling will lie within the preferred range set forth above. To this end, optimum conditions for combination of these factors are desirably determined by preliminary experiments.

The heat treatment is completed before the konjak paste sets. If the heating conditions exceed the upper limit of the optimal range, the konjak paste sets to a gel and undesirably losses its mixibility with other ingredients contrary to what is required according to the present invention. On the other hand, if the heating conditions are lower than the lower limit of the optimal range, the paste will not set to a gel when the konjak paste is reheated, but undesirably remains in the pasty state, i.e. a konjak paste swollen with water.

Once the konjak paste has been appropriately heated as described above, it must be cooled quickly to stop the reaction. If this cooling operation is omitted, the paste undesirably becomes a gel.

Preferred results will be obtained if the heating and cooling operations described above are performed after the konjak paste is placed and sealed in a bag or container made of synthetic resins or some other suitable materials.

To the konjak jelly thus obtained, fruit juice or a substance containing it is added, the ingredients are mixed with stirring, and the resulting mixture is charged into a predetermined container. The mixture will normally gel in the container but it is possible to use fruit juice or a substance containing it which will not cause such gelation of the mixture.

The fruit juice or substance containing it for use in the present invention may be selected from among any known materials including natural fruit juice, concentrated fruit juice, fruit-juice containing beverages, fruit-juice containing refreshing drinks, and nectar. Examples of juices which are preferably used in the present invention are those of soft-fleshed juicy fruits including peach, grape, melon, kiwi fruit, apricot, apple, strewberry, mango, pineapple, pear and mandarine orange These fruit juices and substances containing them may be used either on their own or as admixtures. If two or more kinds of fruit juice or fruit-juice containing substances are to be used in combination, they may be added successively to the konjak jelly. Alternatively, they may be mixed together before being added to the konjak jelly. Various other substances such as fruit puree, fruit pulp and the flesh of fruit in fragments may also be added to the konjak jelly. The proportions in which fruit juice, substances containing it and other additives are mixed with the konjak jelly will vary with the desired physical properties and the concentration of the jelly used, but they are usually in the range of 0.5-5 parts by weight, preferably 2-4 parts by weight, per part by weight of the konjak jelly. If desired, common edible gelling agents such as agar, gelatin and pectin may be added to control the palatability and other properties of the jelly which resembles the flesh of fruit.

Various other additives including sweeteners, seanonings, flavors, sour taste imparting agents, dyes, vitamins, etc. may also be added in accordance with a specific object desired to be attained.

Stirring is one of the important steps for producing the jelly of the present invention which resembles the flesh of fruit. Upon stirring, the mixture of konjak jelly and fruit juice forms a weak gel, whose properties will change with the intensity of stirring. Therefore, the palatability of the final product can be controlled by proper adjustment of the stirring. Stirring can be done with any of the ordinary stirrers used in association with food articles, and stirrers for home use may be employed. With this type of stirrer (200 rps), stirring is generally performed at 10°-25° C. for 20-100 seconds, preferably for 30-60 seconds.

There is no particular limitation on the type of container in which the mixture of konjak jelly and fruit juice is placed, and a suitable container may be selected in accordance with the shape of the jelly to be finally obtained.

After being gelled in the container by the steps described above, the mixture of konjak jelly and fruit juice must be frozen. Freezing is performed at a temperature of −30° C. to −5° C. for a period of 6-30 hours. This can be done usually by placing the gelled mixture in a common freezer (ca. −20° C.) for about 24 hours. The physical properties of the jelly can be subtly changed by adjusting the speed of freezing.

By thawing the frozen gel, a desired thermally irreversible jelly is obtained that has flavor and palatability which are just like those of the flesh of the fruit whose juice is contained in the jelly. The word "palatability" includes mouth-feel, and it will be understood that the thermally-irreversible jelly of the present invention is provided with such mouth-feel of the flesh of the fruit by virtue of its texture which is like the fibrous tissues of the fruit itself. There is no particular limitation on the method of thawing the frozen gel but it is generally thawed at 15°-40° C., preferably at room temperature.

EXAMPLES

The following examples are provided for the purpose of further illustrating the present invention but are in no way to be taken as limiting.

Example 1

To 140 g of a konjak flour, 5 liters of water having 25 g of sodium carbonate and 25 g of sodium dihydrogenphosphate dissolved therein was added to fully swell the konjak flour. The swollen konjak flour was charged into a synthetic resin bag, sealed, heated at 70° C. for 30 minutes and cooled to obtain a konjak jelly.

To 300 g of this konjak jelly, 600 ml of melon juice was added and the ingredients were mixed for one minute by stirring with a mixer at 200 rps. The mixture was packed into a synthetic resin container and allowed to gel. The gel was frozen for 24 hours in a freezer (ca. −20° C.) and thereafter thawed at room temperature. A jelly having the flavor and palatability of melon was obtained.

Example 2

A konjak jelly was prepared as in Example 1 and to 200 g of this jelly, 600 ml of the juice of mashed peach was added and the ingredients were mixed for one minute by stirring with a mixer at 200 rps. The mixture was packed into a synthetic resin container and allowed to gel. The gel was frozen for 24 hours in a freezer (ca. −20° C.) and thereafter thawed at room temperature. A jelly having the flavor and palatability, including the mouth-feel and texture, of peach was obtained.

Example 3

A konjak jelly was prepared as in Example 1 and to 200 g of this jelly, a mixture of grape juice (600 ml) and gelatin (4.5 g) dissolved in a small amount of hot water was added, and the ingredients were mixed for one minute by stirring with a mixer at 200 rps. The mixture was packed into a synthetic resin container and allowed to gel. The gel was frozen for 24 hours in a freezer (ca. −20° C.) and thereafter thawed at room temperature. A jelly having the flavor and palatability of grapes was obtained.

Example 4

A konjak jelly was prepared as in Example 1 and to 200 g of this jelly, a mixture of kiwi fruit juice (600 ml) and pectin (4 g) dissolved in a small amount of hot water was added, and the ingredients were mixed for one minute by stirring with a mixer at 200 rps. The mixture was packed into a synthetic resin container and allowed to gel. The gel was frozen for 24 hours in a freezer (ca. −20° C.) and thereafter thawed at room temperature. A jelly having the flavor and palatability of kiwi fruit was obtained.

Example 5

To 140 g of a konjak flour, 5 liters of water having 15 g of sodium carbonate and 15 g of sodium hydrogenphosphate dissolved therein was added to fully swell the konjak flour. The swollen konjak flour was charged into a synthetic resin bag, sealed, heated at 80° C. for 25 hours and cooled to obtain a konjak jelly.

To 200 g of this konjak jelly 600 g of the juice of mashed peach consisting of 1 part by weight of the flesh of peach and 1 part by weight of syrup (Brix 18) was added and the ingredients were mixed for one minute by stirring with a mixer at 200 rps. This mixture was packed into a synthetic resin container. The mixture of konjak jelly and peach juice in the container was in the state of a sol rather than a gel. The sol was frozen for 24 hours in a freezer (ca. −20° C.) and thereafter thawed at room temperature. The thawed product was a gel, or a jelly having the flavor and palatability of peach.

ADVANTAGES OF THE INVENTION

The jelly of the present invention which resembles the flesh of fruit is an entirely novel food article in jelly form that uses as a base the konjak flour or konjak mannan, which has not previously been used in jelly products of the type contemplated by the present invention. If peach juice is incorporated, the palatability and flavor of the jelly will be just like those of canned peaches. In other words, the present invention provides a jelly that resembles the palatability and flavor of the fruit whose juice is incorporated therein.

Having such unique palatability and flavor, the jelly of the present invention which resembles the flesh of fruit is anticipated to fully satisfy the various taste preferences of the people of today who have a wide variety of likes and dislikes. At the same time, the present invention will offer great benefits to industry, having successfully developed a method of utilizing fruits in a way that is improved not only in economic terms but also in terms of their keeping quality.

What is claimed is:

1. A jelly having tissues having a mouth-feel that resembles that of a peach, which is produced by the steps of:
   (a) mixing water, konjak flour and a basic amino acid, or a basic salt, or a mixture thereof to prepare a konjak paste;
   (b) heating the konjak paste under alkaline conditions;
   (c) cooling the heated paste quickly prior to setting to a gel to prepare a konjak jelly;
   (d) adding the juice of fruit to the konjak jelly and stirring the ingredients to form a mixture;
   (e) freezing the mixture; and
   (f) thawing the frozen mixture.

2. A jelly according to claim 1 wherein the fruit juice originates from at least one fruit selected from the group consisting of peach, grape, melon, kiwi fruit, apricot, apple, strawberry, mango, pineapple, pear and mandarine orange.

3. A jelly according to claim 1 which additionally contains at least one ingredient selected from the group consisting of the flesh of fruit in fragments, edible gelling agents, sweeteners, seasonings, flavors, sour taste imparting agents, dyes, vitamins, fruit puree and fruit pulp.

4. A process for producing a jelly which comprises the steps of:
   (a) forming a konjak paste by mixing konjak flour, an amount sufficient of water to cause the konjak flour to swell and dissolve, and a basic amino acid, a basic salt, or mixture thereof;
   (b) forming a thermally irreversible konjak jelly from said konjak paste by heating said konjak paste under alkaline conditions at a temperature and time sufficient to begin the setting of said konjak paste, and then, prior to completion of setting of said heated konjak paste, rapidly cooling the heated paste and thus stopping said setting prior to essential completion of said setting of said konjak paste;
   (c) adding fruit juice to said thermally irreversible konjak jelly and stirring the ingredients to form a mixture;
   (d) freezing the mixture; and
   (e) thawing the frozen mixture.

5. A process according to claim 4 wherein the juice of fruit is added by incorporating at least one member selected from the group consisting of natural fruit juice, concentrated fruit juice, fruit-juice containing beverages, fruit-juicee containing refreshing drinks, nectar, fruit puree, fruit pulp, and the flesh of fruit in fragments.

6. A process according to claim 4 wherein the fruit juice to be added is at least one member selected from the group consisting of peach, grape, melon, kiwi fruit, apricot, apple, strawberry, mango, pineapple, pear and mandarine orange.

7. A process according to claim 4 wherein the weight ratio of fruit juice to konjak jelly to be mixed therewith is in the range of 2:1 to 4:1.

8. A process according to claim 4 which additionally includes a step of adding and mixing at least one ingredient selected from the group consisting of edible gelling agents, sweeteners, seasonings, flavors, sour taste imparting agents, dyes and vitamins.

9. A process according to claim 4 wherein the mixture is frozen by holding it at a temperature of from −30° to −5° C. for a period of 6–30 hours.

10. A process according to claim 4 wherein the frozen mixture is thawed at a temperature of 15°–40° C.

11. A process according to claim 4 wherein said heating of said konjak paste under alkaline conditions is effected at from 60°–95° C. for from 5 to 210 minutes.

12. A fruit jelly having tissue structure resembling the texture of a peach, said jelly comprising a frozen and thawed weak gel formed of a mixture of fruit juice and konjak jelly, said jelly consisting essentially of a partially set alkaline paste of konjak flour, konjak mannan or a mixture thereof, water, and a basic amino acid, a basic salt, or a mixture thereof.

13. A fruit jelly according to claim 12 wherein the weight ratio of fruit juice to konjak jelly is in the range of 2:1 to 4:1.

14. A fruit jelly according to claim 13 further comprising fruit particles, puree or pulp.

15. A fruit jelly according to claim 13 having been frozen at a temperature of −30° C. to −5° C. for a period of 6–30 hours.

* * * * *